United States Patent [19]

Jerde et al.

[11] Patent Number: 5,428,989

[45] Date of Patent: Jul. 4, 1995

[54] METHOD FOR LOCATING A PRESSURE TRANSIENT SOURCE IN A PIPELINE AND APPARATUS THEREFOR

[75] Inventors: James B. Jerde, Scotts Valley, Calif.; Yuichi Nogami, Kawasaki, Japan

[73] Assignees: NKK Corporation, Tokyo, Japan; Digital Dynamics, Inc., Calif.; H. L. Ledeen Associates, Calif.

[21] Appl. No.: 962,457

[22] Filed: Oct. 16, 1992

[51] Int. Cl.⁶ .............................................. G01M 3/28
[52] U.S. Cl. .................................................. 73/40.5 R
[58] Field of Search ............... 73/40, 40.5 R, 37, 49.1, 73/49.5, 592

[56] References Cited

U.S. PATENT DOCUMENTS 3,851,521 12/1974 Ottenstein .
3,903,729 9/1975 Covington ..................... 73/40.5 R

FOREIGN PATENT DOCUMENTS

0042212A1 12/1981 European Pat. Off. .
0444200A1 9/1991 European Pat. Off. .
0100730 6/1983 Japan ............................. 73/40.5 R
0109237 4/1989 Japan ................................ 73/49.5
0147931 6/1990 Japan ............................. 73/40.5 R
1438237 6/1976 United Kingdom .

Primary Examiner—Hezron E. Williams
Assistant Examiner—Rose M. Finley
Attorney, Agent, or Firm—Frishauf, Holtz, Goodman & Woodward

[57] ABSTRACT

Arrival of a pressure wave front is detected at a plurality of monitoring stations spaced along a protected section of a fluid-carrying pipeline. Arrival times obtained at the monitoring stations are qualified as to whether they correspond to a pressure transient event (critical event) which originated in the protected section. If so, the location, amplitude and time of occurrence of the critical event are determined. An uncertainty zone is derived at the extremes of the protected section having a length dependent on the precision of a time standard to which the monitoring stations are referenced and on the exactness of fluid velocity in the pipeline. An operator is so informed if the location of the critical event is determined to fall in the uncertainty zone. It is also possible to determine whether wave fronts correspond to an event occurring outside the protected section. Information from the resulting pass-through wave is used to update needed parameters useful for the critical event determinations.

19 Claims, 4 Drawing Sheets

METHOD FOR LOCATING A PRESSURE TRANSIENT SOURCE IN A PIPELINE AND APPARATUS THEREFOR

RELATED APPLICATIONS

"Method for Determining Arrival Time and Amplitude of a Wave Front and Apparatus therefor", U.S. Ser. No. 07/962,524 filed concurrently herewith, and "Method for Determining Direction of Travel of a Wave Front and Apparatus Therefor", U.S. Ser. No, 07/962,526 filed concurrently herewith.

BACKGROUND OF THE INVENTION

The present invention relates to a method and an apparatus for detecting and characterizing an event, such as a leak, which causes a pressure transient to occur in a pipeline and, more particularly, to a method and an apparatus for making use of the amplitude, time of arrival, and direction of travel of a wave front caused by the pressure transient to locate the origin of the wave front, determine the size of the leak, and derive its time of occurrence.

It has long been known that most pipeline operational events such as operation of valves, start-up or shut-down of pumps, or a break in the pipeline can result in a sudden pressure change at the location of the event. This pressure transient immediately forms a pressure wave which travels both up-stream and down-stream from the site of the event at the speed of sound in the fluid flowing in the pipeline.

Because of the effect of a leak on the environment, it is imperative to identify the location of the leak quickly, and to determine its magnitude. The nature and urgency of the required remedial action can then be determined.

Various techniques are known for determining such information from the wave front. For example, U.K. Patent Specification No. 1,438,237 determines the origin of a leak from the difference in time of arrival of a wave front at detectors on either side of the leak. Published European Application No. 0 042 212 A1 obtains the same information from the amplitude of the wave front at locations up-stream and down-stream from the leak. U.S. Pat. No. 3,851,521 discloses a technique which can locate the position of a leak based on a difference in arrival time of the wave front at detecting stations on either side of the leak even when the spacing between pairs of detecting stations along the pipeline is unequal.

Once the location and magnitude of the source of the wave front are determined, this information can be used to decide whether it represents a leak, operation of valves or other equipment in the pipeline, or is due to noise.

Various sources of inaccuracies can significantly affect the determinations made by the prior art approaches. For example, uncertainty exists as regards the degree of precision of a time standard to which arrival times at different detecting stations are referenced. Also, the accuracy with which the travel velocity of the wave front in the pipeline is ascertained has some uncertainty, and particularly as it changes with different pipeline fluid constituents. The prior art is incapable of suitably dealing with these sources of inaccuracies.

Results obtained with the prior art are vulnerable to errors due to a plurality of events occurring substantially simultaneously. For example, in a protected 100 km section of the pipeline (monitored by stations spaced along the pipeline) and for a wave front velocity of 1100 m/sec, a wave front takes 90 seconds to travel this distance. If a valve on this same section of pipeline is operated within, say, 90 seconds or so after a leak has sprung, both events will cause a wave front to arrive at the monitoring stations and may be interpreted as corresponding to a single event. Of course, a pressure transient event can also occur outside of the protected section of the pipeline, and a pass-through wave front emanating therefrom will traverse the protected section. This class of signals must also be suitably identified and properly dealt with. Echoes or reflections can also be a serious concern. It is important to be able to separate the wave front signals arriving at various monitoring stations along the pipeline and which are caused by a leak, for example, occurring in the protected section from signals due to normal pipeline-operation-related events occurring outside the protected zone, and from reflections or noise.

As pipeline constituents are changed, various parameters required for locating the source of the event also change. It is important to be able to readily and accurately derive updated values for such parameters, but the prior art is incapable of doing so.

SUMMARY OF THE INVENTION

It is an object of the present invention to quickly and reliably detect an event (such as a leak) on a pipeline, and to accurately determine its location, time of occurrence, and relative size.

Another object of the present invention is to separate signals corresponding to a pressure wave caused by a leak in the pipeline from other signals representing pressure waves caused by other events.

An additional object of the present invention is to identify wave front arrivals caused by an event originating within a protected zone along which are located all of the monitoring stations.

A further object of the present invention is to identify wave front arrivals of a pass-through wave front caused by an event originating outside of the protected zone.

Still another object of the present invention is to determine whether information obtained from detected wave front arrivals and yielding a location of the event near the extremes of the protected zone is subject to the uncertainty inherent in the less than perfect precision of a time standard and the accuracy with which the wave front velocity in the pipeline has been ascertained.

Yet another object of the present invention is to readily, promptly and accurately derive updated values of pipeline parameters which vary as pipeline constituents are changed.

This and other objects are attained in accordance with one aspect of the present invention by providing a plurality of pressure monitoring stations spaced along a pipeline at known distances from each other. An arrival time signal is generated at each of these monitoring stations indicative of an arrival thereat of a pressure wave front. A determination is made whether the arrival time signals from the plurality of monitoring stations correspond to the same event and, if the arrival time signals are determined to correspond to the same event, the occurrence of the event is identified at least by obtaining its location along the pipeline.

Another aspect of the present invention is directed to a method for identifying the occurrence of an event which causes a pressure transient in a pipeline fluid resulting in a pressure wave front emanating from said event and travelling through the pipeline fluid by providing a plurality of pressure monitoring stations spaced along a pipeline at known distances from each other. An arrival time signal is generated at each of these monitoring stations indicative of an arrival thereat of a pressure wave front. Two of these monitoring stations are selected which have generated an arrival time signal during a predetermined time interval. A determination is made whether the arrival signals from the two selected monitoring stations can correspond to a pass-through wave front caused by an event occurring outside of a protected zone bounded on a portion of a pipeline by an upstream-most monitoring station and a downstream-most monitoring station of the plurality of pressure monitoring stations. At least one of the celerity and fluid velocity is derived from the pass-through wave front.

An additional aspect of the present invention is directed to a method for identifying the occurrence of an event which creates a pressure transient in a pipeline fluid resulting in a pressure wave front emanating from said event and travelling through the pipeline fluid by providing a plurality of pressure monitoring stations spaced along a pipeline at known distances from each other. At each of these monitoring stations an arrival time signal is generated indicative of an arrival thereat of a pressure wave front. A plurality of these monitoring stations are selected which have generated an arrival time signal during a predetermined time interval. Arrival time signals are qualified from the plurality of selected monitoring stations. The qualified arrival time signals correspond to the same event occurring in a protected zone of the pipeline bounded by an upstream-most and a downstream-most of the plurality of pressure monitoring stations. Arrival time signals are further qualified from the plurality of selected monitoring stations on the basis that they correspond to a pass-through wave front caused by an event occurring outside of the protected zone. Initial values for celerity and fluid velocity in the pipeline are provided for use in determining at least one of a location, amplitude and time of occurrence of the event occurring in a protected zone based on the qualified arrival time signals corresponding thereto. Updated values for the celerity and fluid velocity in the pipeline are determined from the qualified arrival time signals corresponding to the pass-through wave front for use in the determination of at least one of the location, amplitude and time of occurrence of the event.

Yet another aspect of the present invention is directed to a method for identifying the occurrence of an event which creates a pressure transient in a pipeline fluid resulting in a pressure wave front emanating from said event and travelling through the pipeline fluid by providing a plurality of pressure monitoring stations spaced along a pipeline at known distances from each other, a downstream-most and an upstream-most of these monitoring stations define therebetween a protected zone of the pipeline. At each of these monitoring stations, an arrival time signal indicative of an arrival thereat of a pressure wave front is generated, with these monitoring stations being referenced to a time standard. A length of an uncertainty zone is determined at each end of the protected zone based on a degree of precision of the time standard and of the celerity. The location of the event is determined from arrival time signals generated at the monitoring stations. If the location is in an uncertainty zone, a location signal representing the entire uncertainty zone is outputted. If the location is in the protected zone but not in the uncertainty zone, a location signal corresponding to the determined location of the event is outputted.

A further aspect of the present invention is directed to an apparatus for identifying the occurrence of an event which creates a pressure transient in a pipeline fluid resulting in a pressure wave front emanating from said event and travelling through the pipeline fluid with a plurality of pressure monitoring stations spaced along a pipeline at known distances from each other. At each of the monitoring stations, an arrival time signal is generated indicative of an arrival thereat of a pressure wave front. A determination is made whether the arrival time signals from the plurality of monitoring stations correspond to the same event and, if the arrival time signals are determined to correspond to the same event, the occurrence of the event is identified at least by obtaining its location along the pipeline.

A still further aspect of the present invention is directed to an apparatus for identifying the occurrence of an event which causes a pressure transient in a pipeline fluid resulting in a pressure wave front emanating from said event and travelling through the pipeline fluid with a plurality of pressure monitoring stations spaced along a pipeline at known distances from each other. At each of these monitoring stations, an arrival time signal is generated indicative of an arrival thereat of a pressure wave front. Two of the monitoring stations are selected which have generated an arrival time signal during a predetermined time interval. A means is provided for determining whether the arrival signals from the two selected monitoring stations can correspond to a pass-through wave front caused by an event occurring outside of a protected zone bounded on a portion of a pipeline by an upstream-most monitoring station and a downstream-most monitoring station of said plurality of pressure monitoring stations. At least one of the celerity and fluid velocity is derived from the pass-through wave front.

The present invention has one other aspect directed to an apparatus for identifying the occurrence of an event which creates a pressure transient in a pipeline fluid resulting in a pressure wave front emanating from said event and travelling through the pipeline fluid with a plurality of pressure monitoring stations spaced along a pipeline at known distances from each other, means for generating at each of the monitoring stations an arrival time signal indicative of an arrival thereat of a pressure wave front, means for selecting a plurality of these monitoring stations which have generated an arrival time signal during a predetermined time interval, means for qualifying arrival time signals from the plurality of selected monitoring stations which correspond to the same event occurring in a protected zone of the pipeline bounded by an upstream-most and a downstream-most of the plurality of pressure monitoring stations, means for qualifying arrival time signals from the plurality of selected monitoring stations which correspond to a pass-through wave front caused by an event occurring outside of the protected zone, means for providing initial values for celerity and fluid velocity in the pipeline for use in determining at least one of a location, amplitude and time of occurrence of the event occurring in a protected zone based on the qualified arrival time signals corresponding thereto, and means for determining updated values for the celerity and fluid velocity in the pipeline from said qualified arrival time signals corresponding to the pass-through wave front for use in the determining step.

Another aspect of the present invention is directed to an apparatus for identifying the occurrence of an event which creates a pressure transient in a pipeline fluid resulting in a pressure wave front emanating from said event and travelling through the pipeline fluid with a plurality of pressure monitoring stations spaced along a pipeline at known distances from each other, a downstream-most and an upstream-most of these monitoring stations defining therebetween a protected zone of the pipeline, means for generating at each of the monitoring stations an arrival time signal indicative of an arrival thereat of a pressure wave front, the monitoring stations being referenced to a time standard, means for deriving a length of an uncertainty zone at each end of the protected zone based on a degree of precision of the time standard and of the celerity, means for determining the location of the event from arrival time signals generated at the monitoring stations, means for, if the location is in an uncertainty zone, outputting a location signal representing the entire uncertainty zone, and means for, if the location is in the protected zone but not in the uncertainty zone, outputting a location signal corresponding to the determined location of the event.

DETAILED DESCRIPTION OF THE INVENTION

The following discussion explains how this invention detects and locates a pressure transient event, such as leaks and valve operations, occurring on a pipeline based on the arrival time, magnitude (also referred to hereinbelow as size and amplitude) and, optionally, the travel direction of a pressure wave front caused by the event as the wave front passes two or more monitoring stations located along the pipeline.

Figure 1:
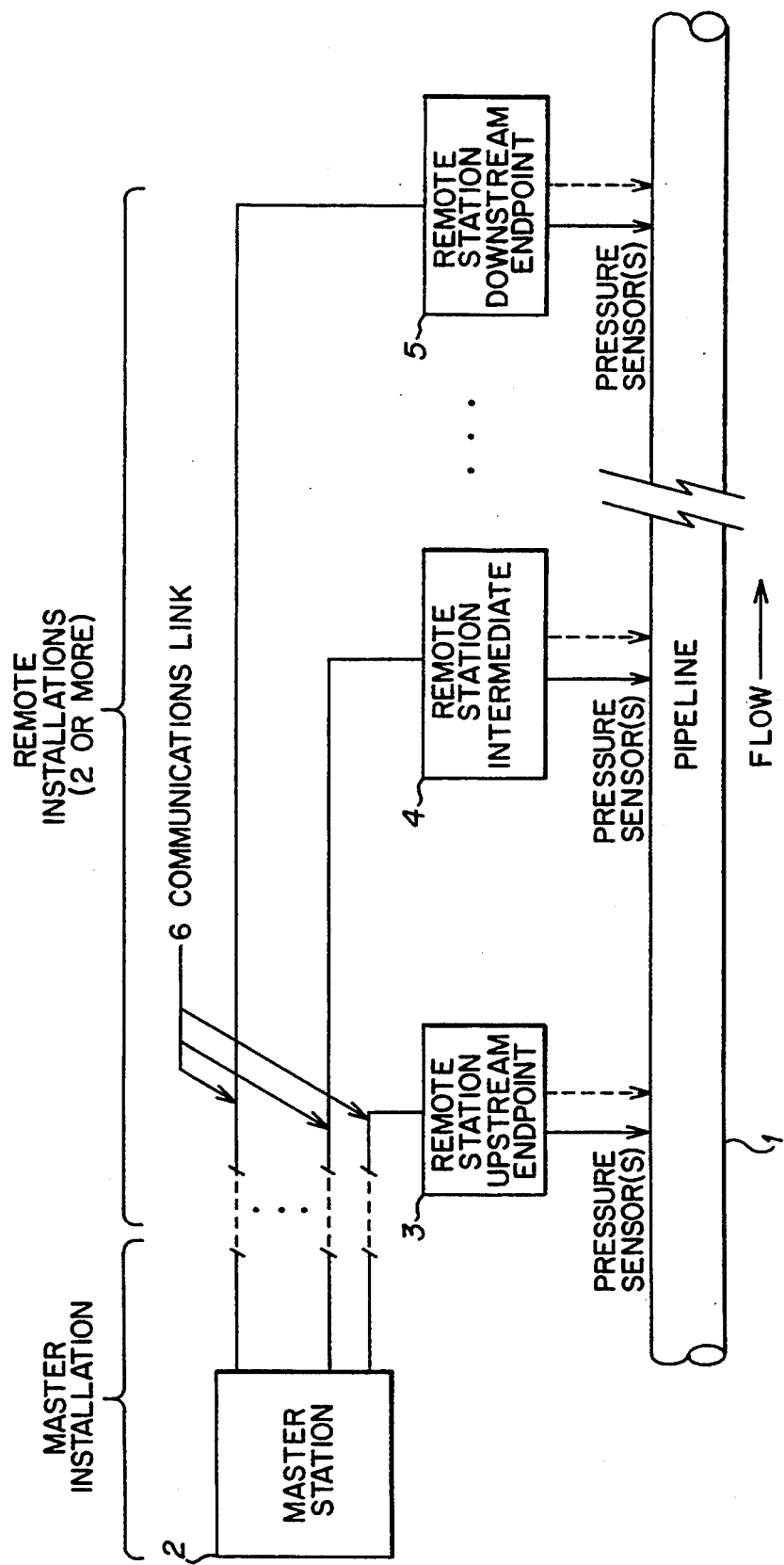
FIG. 1 is a block diagram showing the preferred embodiment of the overall system.

Referring to FIG. 1, remote monitoring stations 3, 4 and 5 are located at two or more sites spaced along the pipeline 1. Each station includes a transducer positioned on the pipeline to detect pressure changes in the pipeline fluid, and apparatus for processing such pressure change information to detect the arrival of a transient wave front and to report its arrival time and amplitude. Optionally, the direction of travel is also determined and reported. Times reported by all monitoring stations are referenced to a common time standard.

The distance between monitoring stations depends on the sensitivity of their transducer, the noise characteristics of the pipeline, and the locations of valves, branch lines, or other possible sources of a transient pressure event. A typical spacing for a gasoline pipeline might be 15 to 30 kilometers, with a maximum distance up to about 100 km. Different sequential pairs of monitoring stations need not all have the same spacing.

Whenever any of the monitoring stations detects a wave front it sends a report to a master station 2 over telecommunication link(s) 6. The link(s) may be any suitable means of transferring the information, including telephone lines, satellite links, etc. The required bandwidth and transmission delay depends on the pipeline and details of the implementation, but typical values would be 2400 baud with no more than a ten second delay.

The master station can be located at any convenient place. It includes apparatus which receives the reports from the monitoring stations and, based thereon, determines the location and size of the event, and the time of occurrence, as explained below.

Locations on the pipeline are specified relative to a reference point. This reference point is an arbitrary but specifically designated position to which all pipeline locations are referred. Typically, it might be a survey marker or a major pump installation. Distances and locations along the pipeline are either positive or negative. A negative location is upstream of the reference point, and a negative distance extends in an upstream direction, where upstream is the direction from which fluid is flowing in the pipeline, and downstream is the direction toward which the fluid is flowing.

One aspect of this invention involves the designation of a "protected zone". The protected zone is that portion of the pipeline within which the system can reliably detect a pressure transient event and determine its location. If a wave front originates outside the protected zone, insufficient information is present in the reports from the monitoring stations to accurately estimate the source location and its size.

Two wave front reports from different monitoring stations which are under consideration as representing a single event are hereinafter referred to as a "wave front pair".

The overall task of the invention includes "detection" and "qualification". Detection is a technique for determining whether a wave front pair possibly represents either a critical event or a pass-through (as defined below), and is based on the wave front arrival time and the locations of the reporting stations.

Qualification is a technique for confirming that a wave front pair actually represent either a critical event or a pass-through and, if it is a critical event, locating the origin of the wave front at a specific point within the protected zone. Qualification is based on wave front arrival time, amplitude and, optionally, direction.

A critical event is a pressure transient event, such as a leak, occurring inside the protected zone.

A pass through is any wave front which traverses the entire protected zone, whether it originates outside the protected zone or is a reflection of an event occurring either inside or outside.

To carry out the detection technique, the invention uses the values of celerity, C, fluid velocity, P, downstream wave front velocity, $V_d$, upstream wave front velocity, $V_u$, maximum distance $D_x$, maximum qualification window, $W_{qx}$, and maximum window tolerance, $W_{tx}$.

The celerity, C, is the speed of sound of a wave front propagating through the fluid in the pipeline, relative to the fluid. It can be determined empirically by measuring the passage time of pass-throughs, as will be described below. Knowledge of the exact pipeline contents would also permit (a) a theoretical calculation based on empirical data and (b) if C for each constituent has already been determined, a calculation based on such values of C and the percentage of each constituent of celerity. A typical value is about 1100 meters per second for a hydrocarbon such as gasoline in a steel pipeline.

The fluid velocity, P, is the speed at which the fluid flows through the pipeline. A typical value is 1 to 2 meters per second.

The downstream wave front velocity, $V_d$, is the speed of wave fronts propagating from downstream. It is computed as $$V_d = C - P \tag{1}$$

The upstream wave front velocity, $V_u$, is the speed of wave fronts propagating from upstream. It is computed as $$V_u = C + P \tag{2}$$

The maximum distance, $D_x$, is different for each reporting station. It is the distance between a particular reporting station and whichever other monitoring station is furthest from that reporting station along the pipeline.

The maximum qualification window, $W_{qx}$, is the period of time transpiring after a wave front report is received and within which any reports from other stations of the arrival of the same wave front must be received if the source of the wave is within the protected zone. $W_{qx}$ is computed based on the distance to the most distant station. If the most distant station is upstream of the reporting station, the maximum qualification window, $W_{qx}$, is computed as $$W_{qx} = D_x / V_d \tag{3}$$

If the most distant station is downstream of the reporting station, the maximum qualification window is computed as $$W_{qx} = D_x / V_u \tag{4}$$

Both these values represent the wave front travel time from a particular reporting station to the station most distant therefrom. A typical value for $W_{qx}$ is 45 seconds for a 50 kilometer stretch of pipeline carrying gasoline.

The maximum window tolerance, $W_{tx}$, is a time value used in connection with the maximum qualification window. It defines the range of wave front arrival time differences, $T_d$, which will be considered effectively equal to the maximum qualification window, as explained in detail below. Its value is based on the uncertainty, $U_t$, of the time standard used for the monitoring stations, the uncertainty, $U_c$, of the celerity value, C, and the maximum distance, $D_x$. It is computed as $$W_{tx} = U_t + (U_c/C)*(D_x/(C + U_c)) \tag{5}$$

A typical value might be 10 milliseconds for a system with time standards accurate to 0.01 sec, and a single fluid in the pipeline with no celerity changes.

The invention treats the pipeline as being divided into the protected zone, which is that portion of the pipeline within which the system can reliably detect a pressure transient event and compute its location, and two unprotected zones, which are portions of the pipeline within which the system cannot reliably detect and/or locate an event. One of the unprotected zones extends from the upstream end of the pipeline to the upstream end of the protected zone, and the other extends from the downstream end of the protected zone to the downstream end of the pipeline. One or the other of the unprotected zones can be eliminated by placing a monitoring station at one of the extreme ends of the pipeline.

The locations of the monitoring stations along the pipeline establish the protected zone, the extent of which is determined by the location $D_{md}$ of the downstream endpoint, which is that remote station which is furthest downstream of all stations associated with the system, the location $D_{mu}$ of the upstream endpoint, which is that remote station which is furthest upstream of all stations associated with the system, and the sizes $U_u$ and $U_d$ of the uncertainty zones.

The upstream endpoint and the downstream endpoint are each adjoined by an uncertainty zone. An uncertainty zone is a portion of the pipeline which is so close to the upstream endpoint or the downstream endpoint that, if a wave front originates inside that zone, the system cannot distinguish whether the event location is in the uncertainty zone or outside the protected zone. The uncertainty zone exists because of precision limits inherent in all available time references, and because of variations in the celerity C (caused by changing pipeline contents).

The size of the uncertainty zones can be computed from $V_u$, $V_d$ and the maximum window tolerance $W_{tx}$. The size of the upstream uncertainty zone, $U_u$, is computed as $$U_u = W_{tx} * V_u \tag{6}$$

The size of the downstream uncertainty zone, $U_d$, is computed as $$U_d = W_{tx} * V_d \tag{7}$$

The size of the uncertainty zones determines the extent of the protected zone. The endpoints $E_u$ and $E_d$ of the protected zone are located at $$E_u = D_{mu} + U_u \tag{8}$$

and at $$E_d = D_{md} - U_d \tag{9}$$

If monitoring stations are positioned at the extreme ends of the pipeline, the entire pipeline can be protected. In this case, the uncertainty zones are simply small portions of the pipeline where the event location cannot be computed precisely. If in accordance with the invention a pressure transient event is determined to originate within an uncertainty zone, the system will simply identify the zone it occurred in, without specifying the location more precisely.

A typical value for the expected location error in the upstream uncertainty zone might be 10 meters for an 80 km segment of pipeline carrying gasoline.

Figure 2:
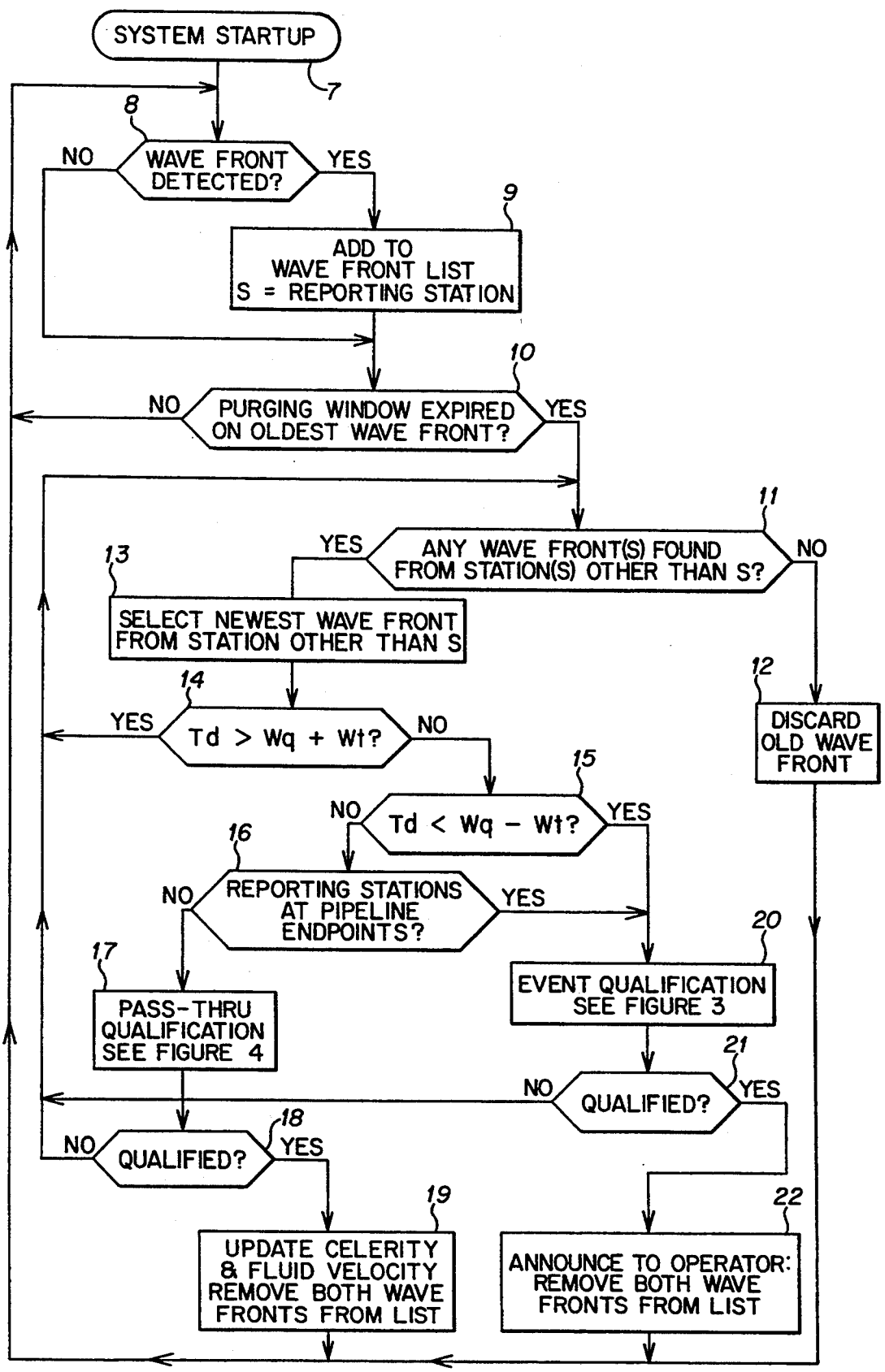
FIG. 2 is a flowchart showing the overall algorithm for detection and qualification of pressure transient events (such as leaks and valve operations).

FIG. 2 shows per step 7 that operation of the system is initiated for the purpose of performing the invention with a conventional initialization routine referred to by the general term "startup". (NOTE: "step" is used herein not necessarily to denote a single operation but, rather, a single box of the drawings having no indication that a sequence of operations is involved, whereas "routine" is used to denote what is described herein and/or shown in the drawings as involving a sequence of operations.) Step 8 checks for receipt of a wave front arrival report from a monitoring station. How a wave front arrival is detected by the monitoring stations is not a direct part of the present invention. Details of one technique for doing so are provided in U.S. Ser. No. 07/962,524 filed concurrently herewith, and such details are hereby incorporated by reference. If a wave front arrival is reported, step 9 adds the reporting station, arrival time, amplitude, and direction (if available) information associated therewith to a list of current wave fronts.

Figure 3:
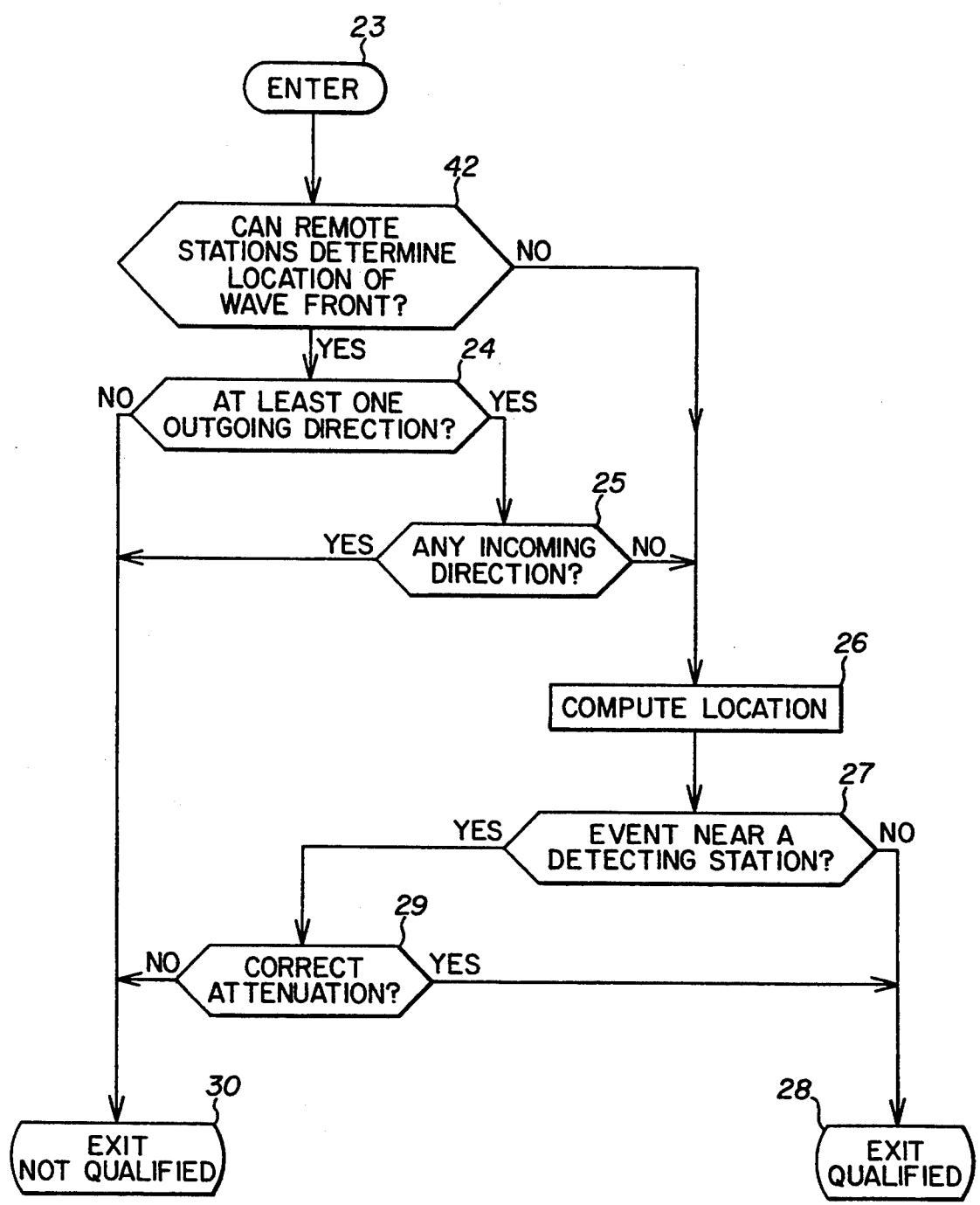
FIG. 3 is a flowchart showing the qualification algorithm for pressure transient events originating within the protected zone.
Figure 4:
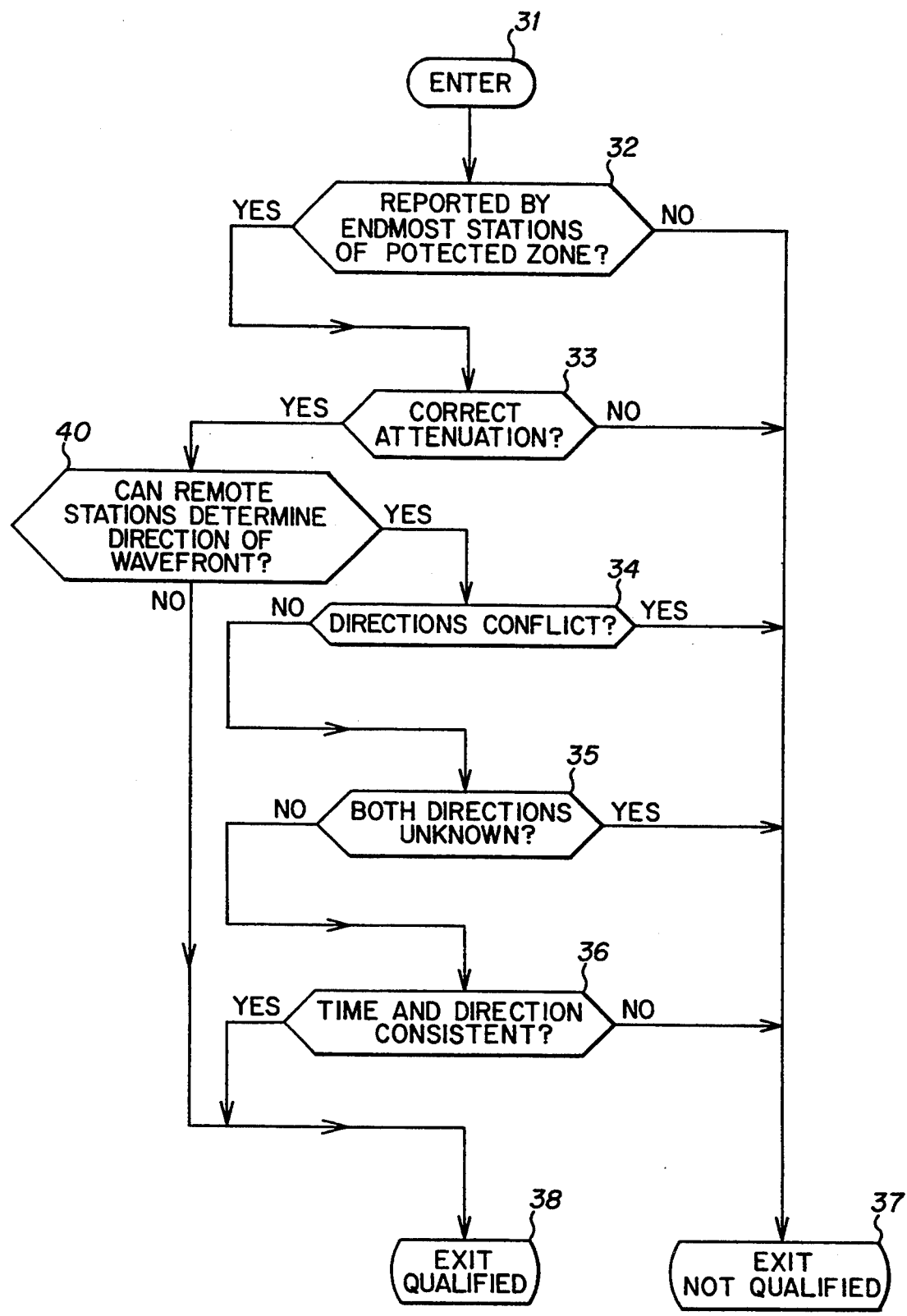
FIG. 4 is a flowchart showing the qualification algorithm for pressure transient events originating outside the protected zone.

If a multitude of wave front arrivals are reported at approximately the same time, these reports are saved and processed in the order of their arrival in accordance with the steps shown in FIGS. 2, 3 and 4 as described herein.

Step 10 examines the arrival time of the oldest wave front on the list of current wave fronts, and determines whether its maximum qualification window $W_{qx}$ has expired. This window is the maximum time between two reports that can represent the same wave front, as determined by equation (3) or (4). If $W_{qx}$ has not expired, the flow returns to step 8.

If $W_{qx}$ has expired, steps 11, 13, 14, 15 and 16 perform the detection process using the wave front. Detection is postponed until $W_{qx}$ for the oldest wave front expires in order to ensure that any and all other reports of the same transient wave have been received.

The first step in detection (it will be recalled that this operation determines whether the wave front pair possibly represents a critical event or a pass-through) is to search the wave front list for a wave front which may confirm the information conveyed by the oldest wave front. If the station reporting the oldest wave front is called station S, step 11 searches the list for any wave front from a station other than S. If no such wave front has been reported, the oldest wave front is unconfirmed and will never be confirmed. This is true because the system has already established that an interval of more than $W_{qx}$ has elapsed since the oldest wave front was detected, and no pair of reports of the same wave front can occur more than $W_{qx}$ apart. Therefore, step 12 removes the oldest wave front report from the list of current wave front reports.

If any wave front(s) were detected at stations other than station S, step 13 selects the newest of said reports. This newest report together with the oldest report form a wave front pair as part of the above-mentioned detection, which means a wave front pair which has not yet undergone the qualification process. The reason for starting off with selection of the oldest and the newest wave fronts as a conditional wave front pair is that these would be the most likely to indicate a pass-through. A better and more efficient processing results from quick identification of a pass-through, as will be evident from the ensuing explanation.

Step 14 refines this detection by examining wave front arrival times. The wave front arrival times are processed in conjunction with the specific qualification window, $W_q$, as determined below, for the two remote stations which reported the wave front pair.

The location of the downstream station on the pipeline (i.e. its distance from the reference point) is referred to as $D_d$, while the location of the upstream station is called $D_u$.

For a specific station which detects the wave front first and another specific station which detects the wave front second, the specific qualification window, $W_q$, is the wave travel time from the first station to the second station. If the first detecting station is upstream of the second detecting station, the specific qualification window is computed from $V_u$, the distance $D_f$ from the reference location to the first station reporting the wave front, and the distance $D_s$ from the reference location to the second station reporting the wave front, as $$W_q = (D_s - D_f)/V_u \qquad (10)$$

If the first detecting station is downstream of the second detecting station, the specific qualification window is computed as $$W_q = (D_f - D_s)/V_d \qquad (11)$$

The specific qualification window $W_q$ is the expected time difference between two wave front arrival times if the wave fronts represent a pass-through. $W_q$ is also the upper bound on the expected time difference between two wave front arrival times if the wave fronts represent a critical event.

The specific window tolerance $W_t$ is a time value used in connection with the specific qualification window. It defines the range of time differences $T_d$ which will be considered effectively equal to the specific qualification window. Its value is based on $U_t$, $U_c$, and the distance between the two specific reporting stations. It is computed as $$W_t = U_t + (U_c/C)*((D_d - D_u)/(C + U_c)) \qquad (12)$$

A typical value might be 10 milliseconds for a system with time standards accurate to 0.01 sec, and a single fluid with no celerity changes.

If the time difference $T_d$ between the two wave front arrival times is found by step 14 to be significantly greater than the specific qualification window $W_q$ for that pair of remote stations, then the two wave fronts must be unrelated. $T_d$ is taken to be significantly greater than $W_q$ if $T_d > W_q + W_t$. If the pair of reports being tested are found by step 14 to be unrelated, the system returns to step 11 in order to search for additional reports from a station other than station S. The wave front arrival report which occurred most immediately before the one which was just tested by step 14 (i.e. the next to the newest report issued for the second cycle) is then processed in the same way as just-described (for the newest report).

If $T_d$ is found by step 14 to not be significantly greater than the qualification window $W_q$, the wave fronts may be related. Step 15 determines whether $T_d$ is approximately equal to the qualification window $W_q$. $T_d$ is taken to be approximately equal to $W_q$ if step 15 finds that $T_d > W_q - W_t$. In other words, the combination of steps 14 and 15 determines whether the value of $T_d$ is within the range $W_q \pm W_t$ and, thus, whether $T_d$ is approximately equal to $W_q$ since the value of $W_t$ is small. If it is (as indicated by a NO output from steps 14 and 15), then step 16 checks whether the two reporting stations are located at the extremes of the physical pipeline. This is so if the two reporting stations are, respectively, at the upstream endpoint $D_{mu}$ and the downstream endpoint $D_{md}$, and the protected zone covers the entire pipeline. In this case, there are no unprotected zones, and pass-throughs cannot occur. If the two reporting stations are not located at the extremes of the physical pipeline, the said wave front pair may represent a pass-through (because $T_d$ equals $W_q$ per steps 14 and 15) which has its origin outside the protected zone. Routine 17 performs pass-through qualification to establish whether all parameters of such wave fronts are consistent with a wave front origin located outside the protected zone. Further details are provided below in describing FIG. 4.

If steps 17 and 18 determine that the wave front pair qualifies as a pass-through, step 19 will update the current values of celerity and fluid velocity in the following manner. First, the parameters of the pass-through just detected are stored. These parameters include the time difference $T_d$ and the pass-through direction, which can be determined by noting which of the two reporting stations detected the wave front first, even if the remote stations are unable to report direction of travel.

The system then retrieves data for the most recent pass-through travelling in the opposite direction (the storage of which is not shown on the drawings). The raw value for the upstream wave front velocity $V_u$ is calculated from $D_{md}$, $D_{mu}$ and the time difference $T_{du}$ of upstream pass-through, as $$V_u = (D_{md} - D_{mu})/T_{du} \quad (13)$$

The raw value for the downstream wave front velocity $V_d$ is calculated from $D_{md}$, $D_{mu}$ and the time difference $T_{dd}$ of the downstream pass-through, as $$V_d = (D_{md} - D_{mu})/T_{dd} \quad (14)$$

The raw value for the fluid velocity, P, is calculated as $$P = (V_u - V_d)/2 \quad (15)$$

The raw value for the celerity C is calculated as $$C = V_u - P \quad (16)$$

Having found new, raw values for celerity and fluid velocity, the system updates its working values for celerity, fluid velocity and upstream and downstream wave front velocity. This is done by passing the raw values through a digital filter (not shown). This filter is designed so as to allow a reasonably rapid response to changing celerities and fluid velocities (due, for example, to a change of pipeline fluid constituents), while filtering out any one-time aberrant readings which may occur. Many suitable filters exist, including the simple one-pole IIR (Infinite Impulse Response) type.

With the above being completed, both wave fronts of the pair representing the pass-through are removed from the current wave front list. This is done because each wave front corresponds to only one pressure transient event. The event corresponding to these wave fronts has already been detected, so they are no longer needed.

If $T_d$ is determined by steps 14 and 15 to be less than $W_q$ (i.e. step 15 generates a YES output) or if $T_d$ is determined by these steps to be approximately equal to $W_q$ but the two reporting stations are located at the extremes of the physical pipeline (as determined by step (16), the two wave fronts may represent a critical pressure transient event, such as a leak. Critical event qualification is then performed by routine 20. Details of this technique are provided below in describing FIG. 3.

If the conditional wave front pair did not qualify, per step 21, as being a wave front pair, the system returns to step 11 to resume searching for wave fronts from a station other than station S.

If the conditional wave front pair did qualify as either a pass-through or a critical event, the system returns to step 8 in order to resume monitoring for wave front reports after step 19 or step 22 is completed.

An explanation will now be provided of FIG. 3 concerning critical event qualification by the algorithm of routine 20. This algorithm varies somewhat, depending on whether or not the monitoring stations are capable of determining the direction of wave travel. One technique which provides such a capability is disclosed in U.S. Ser. No. 07/962,526 the details of which are hereby incorporated by reference.

Upon entry into this routine, depicted as step 23, the directions of the two wave fronts are examined. These directions may be upstream, downstream or unknown. Upstream means that the wave front came from upstream, while downstream means that the wave front came from downstream. Unknown means that the reporting station was unable to determine the direction.

Each pair of monitoring stations defines a monitored zone, which is that portion of the pipeline which lies between those two stations. Each wave front direction is transformed by step 24 to a relative direction, defined as incoming, outgoing, or unknown, purely in reference to the monitored zone corresponding to the pair of wave front reports under consideration, and without distinguishing upstream and downstream. An incoming wave front is one which is entering the monitored zone from outside. An outgoing wave front is one which is leaving the monitored zone from inside. If the reported direction is unknown, the relative direction is also unknown.

In order for a wave front pair to qualify as representing a critical even, the system requires that at least one of the relative directions be outgoing and that neither of them be incoming. If this is not the case, the wave front pair fails critical event qualification. More specifically, step 24 determines whether at least one of the relative directions is outgoing. If not, the algorithm proceeds immediately to step 30 which exits this routine with the pair of wave fronts being designated as not qualified. Otherwise, step 24 leads to step 25 where a determination is made whether either wave front is incoming. If at least one is incoming, the event cannot be considered as having originated in the monitored zone, and the exit step 30 is performed. However, if step 25 yields a NO result, then these two tests ensure that both directions are consistent with an event originating inside the monitored zone, and, further, that they give at least one positive indication of an event originating inside the protected zone.

Step 42 determines whether the monitoring stations have the capability of determining the direction of the wave front. U.S. Ser. No. 07/962,526 filed concurrently herewith provides such a capability. However, not every pipeline installation of a leak detection and alarm system will necessarily have this capability. Information on whether the direction-determining capability exists in the monitoring stations is deduced directly from the content of the messages received from the monitoring stations. It could also be stored in the system by the operator.

If neither monitoring station of the pair has the capability to report directions, as determined by step 42, or if the direction qualification by steps 24 and 25 does not reject the wave front pair, step 26 will compute the location of the critical event. This location is expressed as the distance $D_e$ from the reference point to the origin of the critical event. To correctly allow for the fluid velocity, this computation must distinguish between the downstream station and the upstream station.

First, the distance $D_{eu}$ from the upstream station to the critical event is computed from the upstream wave front velocity, $V_u$, the downstream wave front velocity, $V_d$, the wave front arrival time $T_{ad}$ at said downstream station, the wave front arrival time $T_{au}$ at said upstream station, $D_d$, and $D_u$, as follows:

$$D_{eu} = \frac{(V_u * (T_{au} - T_{ad}) + D_d - D_u)}{\frac{V_u}{V_d} + 1} \quad (17)$$

Next, the distance $D_e$ from the reference point to the event origin is computed as $$D_e = D_u + D_{eu} \quad (18)$$

This is the critical event location.

Step 27 then classifies the location relative to the monitored zone. This consists of determining whether the critical event is an end event (an event located near one end of the monitored zone), or a center event (an event located near the center of the monitored zone). Center events are subject to different qualification criteria than end events, as discussed below.

A threshold distance $D_z$ is used to distinguish between end events and center events. An end event is defined to be located within distance $D_z$ of one of the reporting stations at either end of the monitored zone. The value of $D_z$ is selected with reference to expected errors in reported wave front amplitudes. A typical value of $D_z$ is 25 percent of the distance $D_d - D_u$ between the two reporting stations.

If the critical event is found to be a center event, critical event qualification is complete, the wave front pair is qualified (i.e. it is considered to represent a real event), and the routine is exited per step 28. Center events are not subjected to amplitude qualification, which is the process of establishing that the amplitudes of two wave fronts are consistent with their assumed distances and directions of travel. This is because wave fronts from a center event have travelled similar distances, and amplitude values are more significant when there is a substantial difference in wave front travel distance.

If the critical event is found to be an end event, step 29 performs amplitude qualification. Amplitude qualification for critical events is carried out at follows:
 a) computing the expected amplitude ratio $R_{ee}$, which is the value predicted for the ratio of the two wave front amplitudes based on exponential decay of wave front amplitudes;
 b) computing the actual amplitude ratio $R_{em}$, which is the ratio actually computed from the two reported amplitudes; and
 c) comparing these two ratios.

The expected amplitude ratio $R_{ee}$ is computed from $D_u$, $D_d$, $D_e$, and the pipeline attenuation factor B. This factor, expressed in decibels per unit of distance, is empirically derived, and expresses the exponential rate of amplitude loss observed in a wave front travelling the pipeline. The expected amplitude ratio is computed from the aforementioned values as follows:

$$R_{ee} = \exp\left\{ \frac{B * (D_u + D_d)}{20} - \frac{2 * B * D_e}{20} \right\} \quad (19)$$

The system then directly computes $R_{em}$ from the amplitude $A_u$ measured at the upstream station, and the amplitude $A_d$ measured at the downstream station, by the formula $R_{em} = A_u / A_d$. It then compares $R_{em}$ with $R_{ee}$. The two must agree within an amplitude tolerance F, expressed as a percentage If $|R_{em} - R_{ee}|$ is determined by step 29 to not be greater than F percent of $R_{ee}$, the wave front pair is considered to be qualified, and the critical event qualification algorithm exits per step 28. If $|R_{em} - R_{ee}|$ is determined by step 29 to be greater than F percent of $R_{ee}$, the wave front pair is disqualified (i.e. not considered to represent the same event), and the critical event qualification algorithm exits per step 30.

The amplitude ratio tolerance, F, is selected by the operator, and can be based on expected errors in reported wave front amplitudes, which are determined by the nature of the remote stations and the pipeline characteristics. A typical value is 20 percent.

Returning now to FIG. 2, with the location of the critical event having been determined by step 26, as described above, the amplitude of the event $A_e$ (e.g. leak size) and the time $T_e$ of the event can be determined as per step 41. More specifically, the event amplitude is defined by $$A_e = \exp\left\{ \frac{B * D_{eu}}{20} \right\} * A_u \quad (20)$$

where $A_u$ is the amplitude measured at the upstream station, and $D_{eu}$ is the distance of the event from the upstream station. It is noted that the values $D_{ed}$ and $A_d$ for the downstream station could be substituted for $D_{eu}$ and $A_u$, and should result in the same value for $A_e$. Alternatively, both values could be computed and an average or some combination thereof used. The factor 20 in the above equation corrects for decibel units used to represent B.

Finally the time $T_e$ of event occurrence is computed as $$T_e = T_{au} - (D_{eu}/V_d) \quad (21)$$

If the wave front pair is determined by steps 20 and 21 to qualify as a critical event, the critical event is announced to the station operator, per step 22. This announcement will include the time of occurrence, location and amplitude of the event. If the event is in an uncertainty zone, the announcement will indicate the bounds of the event location in terms of the uncertainty zone rather than specifying a precise location.

With the above steps being completed, both wave fronts are removed from the wave front list. This is done because each wave front corresponds to only one pressure transient event. The event corresponding to these wave fronts has already been detected, so they are no longer needed.

The pass-through qualification algorithm will now be explained in describing FIG. 4. At step 17 in FIG. 2, the system has achieved a conditional pass-through detection, which is a determination that the wave front pair cannot represent a critical event (though they may be related in some other way) but has not yet undergone pass-through qualification. When the pass-through qualification algorithm is entered, as depicted by step 31 in FIG. 4, step 32 checks to see if the two reporting stations are at the upstream endpoint $D_{MU}$ and the downstream endpoint $D_{MD}$ of the protected zone. If they are not, said wave front pair fails pass-through qualification. This is because a wave front is a pass-through only if it enters one end of the protected zone and exits the other. The pass-through qualification algorithm then exits at step 37.

If the two reporting stations are determined by step 32 to be at the upstream and downstream endpoints of the protected zone, step 33 examines the wave front amplitudes. It qualifies these amplitudes by an algorithm similar to the amplitude qualification algorithm used for critical events described above. The expected amplitude ratio $R_{pe}$ for pass-throughs is computed from the pipeline attenuation factor B, $D_f$, and $D_s$, as follows:

$$R_{pe} = \exp\left( \frac{B * (D_f + D_s)}{20} - \frac{2 * B * D_f}{20} \right) \quad (21)$$

The system then directly computes the actual amplitude ratio $R_{pm}$ from the amplitude $A_f$ measured for the first wave front and the amplitude $A_s$ measured for the second wave front, by the formula $R_{pm} = A_f/A_s$, and compares the result with $R_{pe}$. The two said ratios must agree within the tolerance F, defined above. If $|R_{pm} - R_{pe}|$ is greater than F percent of $R_{pe}$, the wave front pair is disqualified, and the pass-through qualification algorithm exits per step 37.

If the wave front pair passes the amplitude qualification test of step 33, step 40 checks whether the monitoring stations have a direction determining capability. Step 40 is similar to step 42 of FIG. 3. If the monitoring stations do not have this capability, then step 40 leads to step 38 for exiting the routine. Otherwise, step 34 examines the wave front directions, if they are available. First, step 34 makes sure that the two wave front directions do not conflict. The said directions are considered to be in conflict if one is upstream and the other is downstream. If the directions are in conflict, the wave front pair fails pass-through qualification, and the algorithm exits per step 37.

If the wave front directions are not in conflict, step 35 determines whether there is a positive indication from either station of the direction of the pass-through. If both wave front directions are unknown, the wave front pair has failed pass-through qualification, and the algorithm exits per step 37.

If the direction of either of these wave fronts is known, this direction is taken to be the direction of the pass-through. Now, step 36 checks for consistency between this direction and the wave front arrival times. If the pass-through direction is upstream, the wave front from the upstream station must have been detected first. If the pass-through direction is downstream, the wave front from the downstream station must have been detected first. If the wave front pair fails this test, it has also failed pass-through qualification, and the algorithm exits the routine per step 37.

If the direction test of step 36 is successful, or if step 40 determines that both monitoring stations are incapable of providing information on the wave front direction, the wave front pair has qualified, and the algorithm exits per step 38.

If a system includes three or more remote monitoring sites, the above concept of wave front pairs could be extended to triples or beyond, up to the number of remote stations, to increase the security against false reports due to coincidences in noise patterns. One way to do so with three or more monitoring stations, for example, is to use the wave front arrivals to form a plurality of different pairs. The information obtained therefrom can be compared for consistency and accuracy. Another way to handle three or more wave front arrivals is by way of specific mathematical relationships therefor analogous to those presented above for one wave front pair.

More than two monitoring stations also would permit keeping separate celerity values for each pair of adjacent stations. This would be especially useful for pipelines carrying mixed products. The pass-through concept could be extended to allow a wave due to a critical event in one pipeline segment to be treated as a pass-through in other segments in order to empirically determine, and update, the values for C and P in each such segment.

A system based on this invention could be used to accurately direct a repair party to a leak site without wasting time searching. The leak size would indicate the urgency and magnitude of the repair effort. The location and time of occurrence information can also help to discriminate between waves due to leaks and those caused by other transient sources.

This invention is not limited to locating leaks. A system based on the above-described invention could also monitor the correct operation of a remote pipeline valve or other device. Each time the valve is commanded to operate, a pressure transient wave would be created. When the master processor detects an event originating at the known location of a valve, a simple logical comparison with the commands could be made to confirm the correct operation of such valve.

The above are just two of many examples of how the pressure event location, size, and time information can be used in a variety of critically important applications.

Although a preferred embodiment of the invention has been described above, various modifications thereto will be readily apparent to one with ordinary skill in the art. For example, rather than using the oldest report matched with the newest one with which it qualifies, it is possible to find all of the newer wave reports which qualify with the oldest, and then to select the best match. The criteria for "best" could depend on such factors as how closely the amplitude ratio matches the value predicted from the time difference, and on whether the directions, if available, agree. It is also possible to track the passage of a wave front through the system, checking for reports as it passes each monitoring station. This is especially applicable when the number of stations is large. Also, some of the operating parameters could be re-adjusted, or tuned, automatically as conditions in the pipeline change. This could be done with parameters F, B and $U_c$ and all values derived from them. All such modifications are intended to be within the scope of the present invention as defined by the following claims.

What is claimed is:

1. A method for identifying the occurrence of an event which creates a pressure transient in a pipeline fluid resulting in a pressure wave front emanating from said event and travelling through the pipeline fluid, comprising the steps of:

provinding a plurality of pressure monitoring stations spaced along a pipeline at known distances from each other;

generating at each of said monitoring stations an arrival time signal indicative of an arrival thereat of a pressure wave front; and determining whether said arrival time signals from said plurality of monitoring stations correspond to the same event and, if said arrival time signals are determined to correspond to the same event, identifying the occurrence of the event by at least obtaining a location of the event along the pipeline;

wherein said determining step comprises selecting a given number of said arrival time signals from different monitoring stations which have been generated during a predetermined time interval, and wherein said identifying step is based on only said selected arrival time signals.

2. The method of claim 1, wherein said predetermined time interval is started from an arrival time signal of a particular one of said monitoring stations, and wherein said selecting step comprises setting the duration of the predetermined time interval for each of said monitoring stations based on a longest distance along the pipeline between one of said monitoring stations for which the duration of the predetermined time interval is being set and any other of said monitoring stations.

3. The method of claim 2, wherein said selecting step comprises:

storing in a list an identity of each of a plurality of monitoring stations which has generated an arrival time signal and also storing data indicative of a plurality of respective arrival times, for a monitoring station corresponding to an oldest arrival time from among said plurality of arrival times stored on said list, checking the list for any arrival time which occurred within said predetermined time interval, and dropping said oldest arrival time from said list if said list has no arrival time within said predetermined time interval.

4. The method of claim 3, wherein the selecting step selects two of said plurality of arrival times stored on said list and identified as belonging to different monitoring stations to form a wave front pair of arrival time signals corresponding thereto.

5. The method of claim 4, wherein said selecting step forms said wave front pair from the oldest arrival time on said list paired with a newest and, if said determining step finds that such wave front pair does not correspond to the same event, pairing said oldest arrival time with an arrival time that is next to the newest arrival time, and so on.

6. A method for identifying the occurrence of an event which creates a pressure transient in a pipeline fluid resulting in a pressure wave front emanating from said event and travelling through the pipeline fluid, comprising the steps of:

providing a plurality of pressure monitoring stations spaced along a pipeline at known distances from each other;

generating at each of said monitoring stations an arrival time signal indicative of an arrival thereat of a pressure wave front; and determining whether said arrival time signals from said plurality of monitoring stations correspond to the same event and, if said arrival time signals are determined to correspond to the same event, identifying the occurrence of the event by at least obtaining a location of the event along the pipeline;

wherein said determining step comprises the steps of:

associating an arrival of a wave front at said monitoring stations with a travel direction of said wave front; and enabling said event occurrence identification step if a travel direction obtained from at least one of said monitoring stations is out of a monitored zone and one is a direction into said monitored zone, said monitored zone being a portion of the pipeline between those of the plurality of monitoring stations spaced furthest apart from each other.

7. The method of claim 6, wherein said determining step comprises the steps of:

classifying said monitored zone into an end portion adjacent each of said two monitoring stations and a center portion extending between said end portions;

outputting said obtained location of the event if said obtained location falls in said center portion; and if said obtained location falls in either of said end portions, measuring a wave front amplitude at each of said selected monitoring stations, and enabling said identifying step if a ratio of two of said measured amplitudes agrees with an amplitude ratio for corresponding monitoring stations based on a pipeline attenuation factor and a distance therebetween.

8. A method for identifying the occurrence of an event which causes a pressure transient in a pipeline fluid resulting in a pressure wave front emanating from said event and travelling through the pipeline fluid, comprising the steps of:

providing a plurality of pressure monitoring stations spaced along a pipeline at known distances from each other;

generating at each of said monitoring stations an arrival time signal indicative of an arrival thereat of a pressure wave front;

selecting two of said monitoring stations which have generated an arrival time signal during a predetermined time interval;

determining if said arrival signals from said two selected monitoring stations correspond to a pass-through wave front caused by an event occurring outside of a protected zone bounded on a portion of a pipeline by an upstream-most monitoring station and a downstream-most monitoring station of said plurality of pressure monitoring stations; and deriving, from arrival signals that correspond to a pass-through wave front, at least one of celerity and fluid velocity.

9. The method of claim 8, wherein said determining step comprises inhibiting said deriving step if said two selected monitoring stations are at the ends of said pipeline.

10. The method of claim 8, wherein said determining step comprises the steps of enabling said deriving step if (a) said two selected monitoring stations are the stations which bound said protected zone, and (b) a time difference between arrival of the wave front at said two selected monitoring stations is substantially equal to a time difference based on a distance between said two selected monitoring stations and a velocity of said wave front in the pipeline.

11. The method of claim 10, wherein said generating step comprises measuring an amplitude of the pressure wave front arriving at each of said monitoring stations, and wherein said determining step further comprises the step of enabling said deriving step if an amplitude ratio of the wave front amplitudes measured at said two selected monitoring stations agrees with an amplitude ratio based on a pipeline attenuation factor and a length of said protected zone.

12. The method of claim 11, further comprising the step of associating an arrival of a wave front at each of said plurality of monitoring stations with a travel direction of said wave front; and wherein said determining step further comprises the step of enabling said deriving step if the travel direction of the wave front at one of said two selected monitoring stations does not conflict with the travel direction of the wave front at the other of said two selected monitoring stations and, in the absence of such a conflict, designating a travel direction for said wave front.

13. The method of claim 12, wherein said determining step comprises the step of enabling said deriving step if the designated wave front direction agrees with the chronology of respective arrival times of the wave front at said two selected monitoring stations.

14. A method for identifying the occurrence of an event which creates a pressure transient in a pipeline fluid resulting in a pressure wave front emanating from said event and travelling through the pipeline fluid, comprising the steps of:

providing a plurality of pressure monitoring stations spaced along a pipeline at known distances from each other;

generating at each of said monitoring stations an arrival time signal indicative of an arrival thereat of a pressure wave front;

selecting a plurality of said monitoring stations which have generated an arrival time signal during a predetermined time interval;

qualifying arrival time signals from said plurality of selected monitoring stations which correspond to the same event occurring in a protected zone of the pipeline bounded by an upstream-most and a downstream-most of said plurality of pressure monitoring stations;

qualifying arrival time signals from said plurality of selected monitoring stations which correspond to a pass-through wave front caused by an event occurring outside of said protected zone;

providing initial values for celerity and fluid velocity in the pipeline for use in determining at least one of a location, amplitude and time of occurrence of said event occurring in a protected zone based on said qualified arrival time signals corresponding thereto; and determining updated values for said celerity and fluid velocity in the pipeline from said qualified arrival time signals corresponding to said pass-through wave front for use in determining the at least one of a location, amplitude and time of occurrence.

15. The method of claim 14, further comprising the step of filtering the determined updated values for said celerity and fluid velocity to filter out aberrant values.

16. A method for identifying the occurrence of an event which creates a pressure transient in a pipeline fluid resulting in a pressure wave front emanating from said event and travelling through the pipeline fluid, comprising the steps of:

providing a plurality of pressure monitoring stations spaced along a pipeline at known distances from each other, a downstream-most and an upstream-most of said monitoring stations defining ends of a protected zone of the pipeline;

generating at each of said monitoring stations an arrival time signal indicative of an arrival thereat of a pressure wave front, said monitoring stations being referenced to a time standard;

deriving a length of an uncertainty zone at each end of said protected zone based on a degree of precision of the time standard and of celerity;

determining the location of said event from arrival time signals generated at said monitoring stations;

if said location is in said uncertainty zone at one end of said protected zone, outputting a location signal representing the entire uncertainty zone at said one end of said protected zone; and if said location is in said protected zone but not in said uncertainty zone at either end of the protected zone, outputting a location signal corresponding to the determined location of said event.

17. An apparatus for identifying the occurrence of an event which causes a pressure transient in a pipeline fluid resulting in a pressure wave front emanating from said event and travelling through the pipeline fluid, comprising:

a plurality of pressure monitoring stations spaced along a pipeline at known distances from each other;

means for generating at each of said monitoring stations an arrival time signal indicative of an arrival thereat of a pressure wave front;

means for selecting two of said monitoring stations which have generated an arrival time signal during a predetermined time interval;

means for determining if said arrival signals from said two selected monitoring stations correspond to a pass-through wave front caused by an event occurring outside of a protected zone bounded on a portion of a pipeline by an upstream-most monitoring station and a downstream-most monitoring station of said plurality of pressure monitoring stations; and means for deriving, from arrival signals corresponding to a pass-through wave, at least one of celerity and fluid velocity.

18. An apparatus for identifying the occurrence of an event which creates a pressure transient in a pipeline fluid resulting in a pressure wave front emanating from said event and travelling through the pipeline fluid, comprising:

a plurality of pressure monitoring stations spaced along a pipeline at known distances from each other;

means for generating at each of said monitoring stations an arrival time signal indicative of an arrival thereat of a pressure wave front;

means for selecting a plurality of said monitoring stations which have generated an arrival time signal during a predetermined time interval;

means for qualifying arrival time signals from said plurality of selected monitoring stations which correspond to the same event occurring in a protected zone of the pipeline bounded by an upstream-most and a downstream-most of said plurality of pressure monitoring stations;

means for qualifying arrival time signals from said plurality of selected monitoring stations which correspond to a pass-through wave front caused by an event occurring outside of said protected zone;

means for providing initial values for celerity and fluid velocity in the pipeline for use in determining at least one of a location, amplitude and time of occurrence of said event occurring in a protected zone based on said qualified arrival time signals corresponding thereto; and means for determining updated values for said celerity and fluid velocity in the pipeline from said qualified arrival time signals corresponding to said pass-through wave front for use in determining the at least one of the location, amplitude and time of occurrence of the event.

19. An apparatus for identifying the occurrence of an event which creates a pressure transient in a pipeline fluid resulting in a pressure wave front emanating from said event and travelling through the pipeline fluid, comprising:

a plurality of pressure monitoring stations spaced along a pipeline at known distances from each other, a downstream-most and an upstream-most of said monitoring stations defining ends of a protected zone of the pipeline;

means for generating at each of said monitoring stations an arrival time signal indicative of an arrival thereat of a pressure wave front, said monitoring stations being referenced to a time standard;

means for deriving a length of an uncertainty zone at each end of said protected zone based on a degree of precision of the time standard and of celerity;

means for determining a location of said event from arrival time signals generated at said monitoring stations;

means for, if said location is in said uncertainty zone at one end of said protected zone, outputting a location signal representing the entire uncertainty zone at said one end of the uncertainty zone; and means for, if said location is in said protected zone but not in said uncertainty zone at either end of said protected zone, outputting a location signal corresponding to the determined location of said event.

* * * * *